US010534601B1

(12) United States Patent
Venkata et al.

(10) Patent No.: US 10,534,601 B1
(45) Date of Patent: Jan. 14, 2020

(54) IN-SERVICE SOFTWARE UPGRADE OF VIRTUAL ROUTER WITH REDUCED PACKET LOSS

(71) Applicant: Juniper Networks, Inc., Sunnyvale, CA (US)

(72) Inventors: Suresh Kumar Vinapamula Venkata, Santa Clara, CA (US); Rajagopalan Sivaramakrishnan, Sunnyvale, CA (US); Sachin Bansal, Fremont, CA (US); Praveen K V, Bangalore (IN); Hari Prasad Killi, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/639,556

(22) Filed: Jun. 30, 2017

(51) Int. Cl.
*G06F 8/65* (2018.01)
*H04L 12/713* (2013.01)
*G06F 8/61* (2018.01)
*H04L 12/721* (2013.01)
*H04L 12/24* (2006.01)

(52) U.S. Cl.
CPC .............. *G06F 8/65* (2013.01); *G06F 8/61* (2013.01); *H04L 41/046* (2013.01); *H04L 45/38* (2013.01); *H04L 45/586* (2013.01)

(58) Field of Classification Search
CPC .............. G06F 8/65; G06F 8/656–658; G06F 8/70–71; G06F 8/61; H04L 41/046–048; H04L 45/38; H04L 45/586
See application file for complete search history.

(56) References Cited

U.S. PATENT DOCUMENTS

| 6,760,328 | B1 | 7/2004 | Ofek |
| 7,042,838 | B1 | 5/2006 | Shand et al. |
| 7,184,437 | B1 | 2/2007 | Cole et al. |

(Continued)

FOREIGN PATENT DOCUMENTS

WO 2013184846 A1 12/2013

OTHER PUBLICATIONS

Vanbever et al., "HotSwap: Correct and Efficient Controller Upgrades for Software-Defined Networks," ACM, Aug. 16, 2013, 6 pp.

(Continued)

*Primary Examiner* — Eric Myers
(74) *Attorney, Agent, or Firm* — Shumaker & Sieffert, P.A.

(57) ABSTRACT

Techniques are disclosed for performing an In-Service Software Upgrade ("ISSU") of a first packet forwarding component (PFC) of a virtual router configured to forward traffic flows for a plurality of session instances within a cloud-based data center. The techniques described herein may retain flow state information throughout the ISSU process without interrupting network traffic flow. In one example, a processor of a plurality of compute nodes within the data center receives a request to perform an ISSU of the first PFC. The processor spawns a second virtual routing agent and a second PFC. The second virtual routing agent synchronizes flow state information with a first virtual routing agent for the virtual router. After synchronizing the flow state information, the virtual router switches from forwarding traffic flows by the first PFC to forwarding traffic flows by the second PFC. The ISSU process deactivates the first virtual router and the first PFC.

19 Claims, 7 Drawing Sheets

(56) References Cited

U.S. PATENT DOCUMENTS

| | | |
|---|---|---|
| 7,519,006 B1 | 4/2009 | Wing |
| 7,937,492 B1 | 5/2011 | Kompella et al. |
| 8,339,959 B1 | 12/2012 | Moisand et al. |
| 8,782,632 B1 * | 7/2014 | Chigurapati .............. G06F 8/65 717/172 |
| 9,356,866 B1 * | 5/2016 | Sivaramakrishnan ....................... H04L 45/7453 |
| 9,641,435 B1 | 5/2017 | Sivaramakrishnan |
| 2007/0195797 A1 | 8/2007 | Patel et al. |
| 2010/0061242 A1 | 3/2010 | Sindhu et al. |
| 2016/0182351 A1 | 6/2016 | Wang et al. |
| 2016/0191306 A1 | 6/2016 | Gasparakis et al. |
| 2016/0352629 A1 | 12/2016 | Wang et al. |

OTHER PUBLICATIONS

Hopps, "Analysis of an Equal-Cost Multi-Path Algorithm," RFC 2992, Network Working Group, Nov. 2000, 8 pp.

Venkata, "OpenContrail in Service Software Upgrade," GitHub, OpenContrail Blog, Jun. 16, 2016, accessed from http://www.opencontrail.org/opencontrail-in-service-software-upgrade/, 7 pp.

"TCG Trusted Network Connection—TNC IF-MAP Binding for SOAP—Specification Version 2.1, Revision 15," Trusted Computing Group, May 7, 2012, 81 pp.

U.S. Appl. No. 15/087,286, by Juniper Networks, Inc. (Inventors: Venkata et al.), filed Mar. 31, 2016.

* cited by examiner

US 10,534,601 B1

IN-SERVICE SOFTWARE UPGRADE OF VIRTUAL ROUTER WITH REDUCED PACKET LOSS

TECHNICAL FIELD

This disclosure generally relates to the software maintenance of cloud data centers and networks.

BACKGROUND

In a typical cloud data center environment, there is a large collection of interconnected servers that provide computing (e.g., compute nodes) and/or storage capacity to run various applications. For example, a data center typically includes one or more facilities that hosts applications and services for subscribers, i.e., customers of the data center. The data center, for example, hosts all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Periodically, the networking and storage systems of the data center may need to be updated. For example, software installed and running on compute nodes or other devices within the data center may need to be either upgraded or replaced. Installing the software update typically requires the compute node or infrastructure device to transition offline and stop execution or management of customer applications so that the software update may be performed. During this period, customer traffic flow and customer applications executing within the cloud data center may be interrupted or entirely unavailable.

SUMMARY

Techniques are described for performing an In-Service Software Upgrade ("ISSU") of a packet forwarding component (PFC) of a virtual router operating on one or more servers of a cloud-based data center wherein flow state information is retained throughout the ISSU process without interruption to network traffic flow. As described herein, in one example implementation, an ISSU process dynamically, and in real time, spawns one or more duplicate software components for the virtual router. Each of the duplicate components may include updated versions of the original components of the virtual router, such as updated packet forwarding components. Moreover, the ISSU process spawns a second virtual routing (VR) agent which is configured to continuously synchronize flow state information with an original VR agent of the virtual router. After the flow state information is synchronized between the first and second VR agents, the ISSU process seamlessly transitions individual traffic flows flowing through the original components of the virtual router to the one or more duplicate components of the virtual router. After the ISSU process has migrated the traffic flows, it deallocates the original components of the virtual router, as well as the original VR agent. Accordingly, the virtual router may continue forwarding individual traffic flows via the duplicate, updated components while retaining flow state information for the various network traffic flows. Thus, a cloud data center according to the techniques of the disclosure may upgrade one or more components of a virtual router while ensuring customer traffic flow and customer applications executing within the cloud data center continue without interruption and without rebuilding flow state records each time an ISSU is performed.

In one example, the techniques of the disclosure describe a method including: receiving, by at least one processor of a plurality of compute nodes configured to perform compute functions for a plurality of session instances of a cloud data center, a request to perform an in-services software upgrade (ISSU) of a first packet forwarding component of a virtual router configured to forward traffic flows for the plurality of session instances; spawning, by the at least one processor, a second virtual routing agent for the virtual router; and synchronizing, by the at least one processor, flow state information between the second virtual routing agent and a first virtual routing agent of the virtual router.

In another example, the techniques of the disclosure describe at least one processor of a plurality of compute nodes configured to perform compute functions for a plurality of session instances of a cloud data center, the at least one processor configured to: receive a request to perform an in-services software upgrade (ISSU) of a first packet forwarding component of a virtual router configured to forward traffic flows for the plurality of session instances; spawn a second virtual routing agent for the virtual router; and synchronize flow state information between the second virtual routing agent and a first virtual routing agent of the virtual router.

In another example, the techniques of the disclosure describe a non-transitory computer-readable medium including instructions that, when executed, cause at least one processor of a plurality of compute nodes configured to perform compute functions for a plurality of session instances of a cloud data center to: receive a request to perform an in-services software upgrade (ISSU) of a first packet forwarding component of a virtual router configured to forward traffic flows for the plurality of session instances; spawn a second virtual routing agent for the virtual router; and synchronize flow state information between the second virtual routing agent and a first virtual routing agent of the virtual router.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
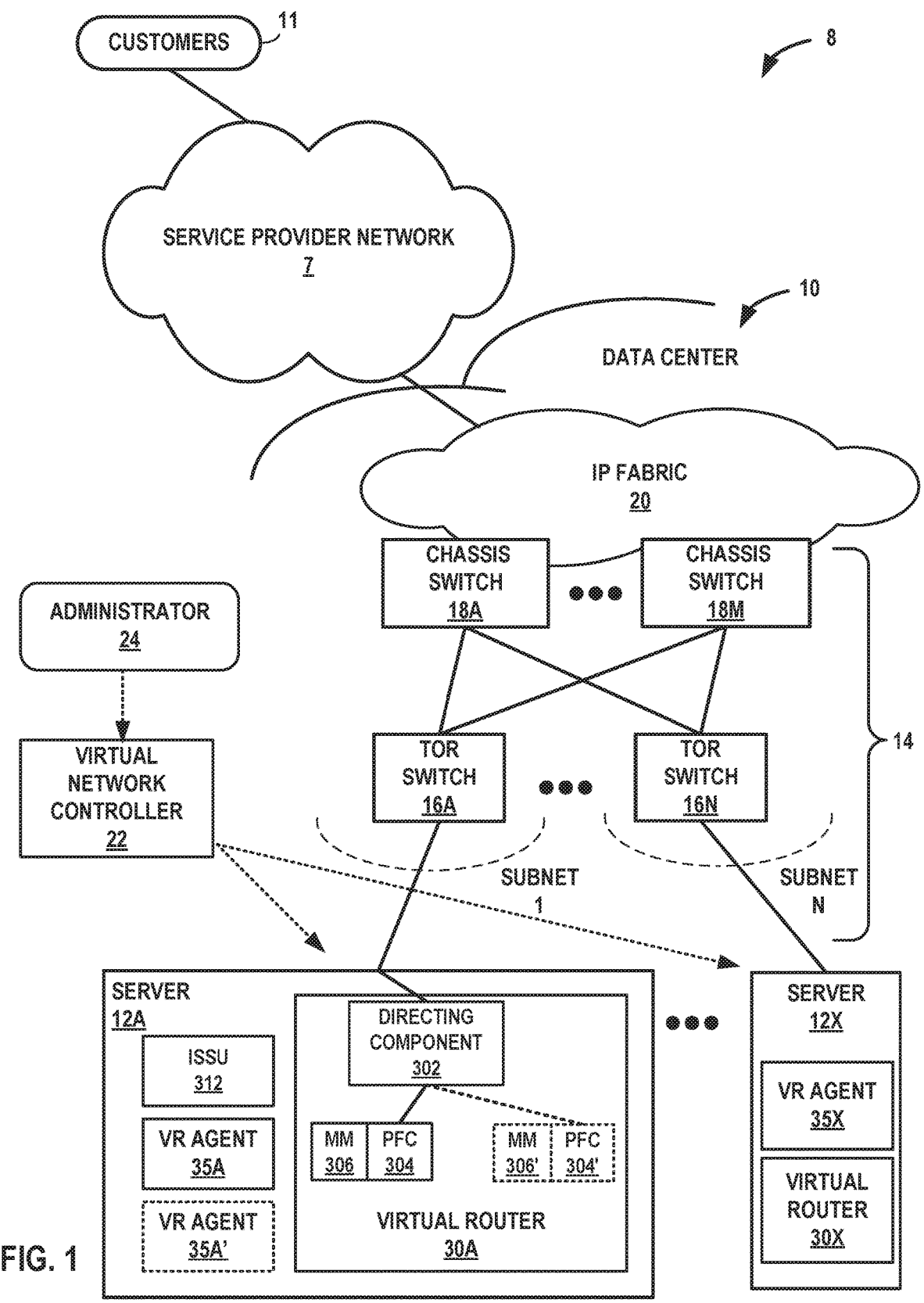
FIG. 1 is a block diagram illustrating an example network having a data center in which examples of the techniques described herein may be implemented.

FIG. 1 is a block diagram illustrating an example network 8 having a data center 10 in which examples of the techniques described herein may be implemented. In general, data center 10 provides an operating environment for applications and services for customers 11 coupled to the data center by service provider network 7. Data center 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 may be a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 10 may be individual network servers, network peers, or otherwise.

In this example, data center 10 includes a set of storage systems and application servers 12A-12X (herein, "servers 12") interconnected via high-speed switch fabric 14 provided by one or more tiers of physical network switches and routers. Switch fabric 14 is provided by a set of interconnected top-of-rack (TOR) switches 16A-16BN (collectively, "TOR switches 16") coupled to a distribution layer of chassis switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 16 and chassis switches 18 provide servers 12 with redundant (multi-homed) connectivity to IP fabric 20 and service provider network 7. Chassis switches 18 aggregate traffic flows and provides high-speed connectivity between TOR switches 16. TOR switches 16 may be network devices that provide layer two (e.g., MAC) and/or layer 3 (e.g., IP) routing and/or switching functionality. TOR switches 16 and chassis switches 18 may each include one or more processors and a memory, and that are capable of executing one or more software processes. Chassis switches 18 are coupled to IP fabric 20, which performs layer 3 routing to route network traffic between data center 10 and customers 11 by service provider network 7.

Virtual network controller 22 ("VNC") provides a logically and in some cases physically centralized controller for facilitating operation of one or more virtual networks within data center 10 in accordance with one or more embodiments of this disclosure. In some examples, virtual network controller 22 may operate in response to configuration input received from network administrator 24. Additional information regarding virtual network controller 22 operating in conjunction with other devices of data center 10 or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

Typically, the traffic between any two network devices, such as between network devices within IP fabric 20 (not shown) or between servers 12 and customers 11 or between servers 12, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyzes one particular multipath routing strategy involving the assignment of flows to bins by hashing packet header fields that sends all packets from a particular network flow over a single deterministic path.

For example, a "flow" can be defined by the five values used in a header of a packet, or "five-tuple," i.e., the protocol, Source IP address, Destination IP address, Source port and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

As described herein, each of servers 12 include a respective virtual router 30 that executes multiple routing instances for corresponding virtual networks within data center 10 and routes the packets to appropriate virtual machines executing within the operating environment provided by servers 12. Packets received by virtual router 30A of server 12A, for example, from switch fabric 14 may include an outer header to allow the physical network fabric to tunnel the payload or "inner packet" to a physical network address for a network interface of server 12A that executes virtual router 30A. The outer header may include not only the physical network address of the network interface of the corresponding server 12A but also a virtual network identifier such as a VxLAN tag or Multiprotocol Label Switching (MPLS) label that identifies one of the virtual networks executed by server 12A as well as the corresponding routing instance executed by virtual router 30A. An inner packet includes an inner header having a destination network address that conforms to the virtual network addressing space for the virtual network identified by the virtual network identifier.

In some aspects, virtual router 30A buffers and aggregates multiple tunneled packets received from the underlying physical network fabric prior to delivery to the appropriate routing instance for the packets. That is, each of virtual routers 30 executing on a corresponding one of servers 12 may receive inbound tunnel packets of a packet flow from TOR switches 16 and, prior to routing the tunnel packets to a locally executing virtual machine, process the tunnel packets to construct a single, aggregate tunnel packet for forwarding to the virtual machine. That is, virtual router 30A may buffer multiple inbound tunnel packets and construct the single, tunnel packet in which the payloads of the multiple tunnel packets are combined into a single payload and the outer/overlay headers on the tunnel packets are removed and replaced with a single header virtual network identifier. In this way, the aggregate tunnel packet can be forwarded by virtual router 30A to the virtual machine as if a single inbound tunnel packet was received from the virtual network. Moreover, to perform the aggregation operation, virtual router 30A may leverage a kernel-based offload engine that seamlessly and automatically directs the aggregation of tunnel packets. Further example techniques by which virtual routers 30 forward traffic to the customer-specific virtual machines executing on servers 26 are described in U.S. patent application Ser. No. 14/228,844, entitled "PACKET SEGMENTATION OFFLOAD FOR VIRTUAL NETWORKS," incorporated herein by reference.

In some example implementations, the virtual routers 30 executing on servers 12 steer received inbound tunnel packets among multiple processor cores to facilitate packet processing load balancing among the cores when processing the packets for routing to one or more virtual and/or physical machines. As one example, server 12A includes multiple network interface cards and multiple processor cores to execute virtual router 30A and steers received packets among multiple processor cores to facilitate packet processing load balancing among the cores. For instance, a particular network interface card of server 12A may be associated with a designated processor core to which the network interface card directs all received packets. The various processor cores, rather than processing each of the received packets, offloads flows to one or more other processor cores, in accordance with a hash function applied to at least one of the inner and outer packet headers, for processing to take advantage of available work cycles of the other processor cores.

In an example implementation of virtual router 30A, and as depicted in the example of FIG. 1, the functions of virtual router 30A may be implemented by directing component 302, packet forwarding component (PFC) 304, and memory module 306. In one example, directing component 302 is a light-weight indirection module that functions to direct in-bound packet flows to an active PFC, such as PFC 304. Directing component 302 is further configured to switch or redirect in-bound packet flows from active PFC 304 to an upgraded PFC, such as PFC 304', during an ISSU of virtual router 30, as described below. In some examples, directing component 302 is an rx_handler register function. In further examples, directing component 302 is implemented such that directing component 302 need not be upgraded across releases. In other words, in some examples, directing component 302 may have only the functions necessary to identify an active PFC and, during an ISSU, switch from an active PFC to an upgraded PFC, such that it is not necessary to upgrade the directing component during the ISSU.

As mentioned above, virtual router 30A further includes PFC 304 and memory module 306. In some examples, PFC 304 is registered to directing component 302. In this example implementation of virtual router 30A, PFC 304 and memory module 306 perform the virtual routing functions of virtual router 30A described above. For example, PFC 304 processes packets for traffic flows received and forwarded by virtual router 30A. Memory module 306 stores flow state information for PFC 304, such as network routing data and configuration state data. PFC 304 uses the flow state information stored within memory module 306 to steers received packets for the traffic flows to their destination (e.g., virtual machines executed by server 12A or next-hop destinations within switch fabric 14).

As described herein, each of servers 12 include a respective VR agent 35 that communicates with VNC 22 and, responsive thereto, directs a respective virtual router 30 so as to control the overlay of virtual networks and coordinate the routing of data packets within each server 12. In the example implementation of FIG. 1, for example, VR agent 35A may install and maintain, in memory module 306, flow state information for network traffic flows received by virtual router 30A so as to enable virtual router 30A to process and forward received network traffic flows. In general, each VR agent 35 communicates with VNC 22, which generates commands to control routing of packets through data center 10. VR agents 35 execute in user space and operate as a proxy for control plane messages between virtual machines of server 12 and VNC 22. For example, a virtual machine executing on server 12A may request to send a message using its virtual address via VR agent 35A, and VR agent 35A may in turn send the message and request that a response to the message be received for the virtual address of the virtual machine that originated the first message. In some cases, a virtual machine invokes a procedure or function call presented by an application programming interface (API) of VR agent 35A, and the VR agent 35A handles encapsulation of the message as well, including addressing.

Generally, PFC 304 processes packets according to "slow-path packet processing" or "fast-path packet processing." When PFC 304 receives a first packet for a new traffic flow, PFC 304 determines that it lacks a corresponding flow table entry in memory module 306. Accordingly, PFC 304 forwards the first packet to VR agent 35A, which installs a flow table entry for the new traffic flow. This is referred to as the "slow-path packet processing" because it invokes user space to process the packet. However, after the corresponding flow table entry is installed in memory module 306, PFC 304 may use the flow table entry for the new traffic flow to process all subsequent packets for the new traffic flow without invoking VR agent 35A in userspace. This path is referred to as "fast-path packet processing" because it only invokes kernel space processes to process the packet, which is much faster than invoking userspace processes.

In accordance with various aspects of the techniques described in this disclosure, an ISSU of a packet forwarding component 304 of virtual router 30A operating on one or more servers 12 of cloud data center 10 is performed wherein flow state information is retained throughout the ISSU process without interruption to network traffic flow. In the example of FIG. 1, ISSU process 312 dynamically, and in real time, spawns, for virtual router 30, a second PFC 304' registered to directing component 302 and a second memory module 306' within virtual router 30A. Further, ISSU process 312 spawns a second VR agent 35A'. Moreover, during the ISSU process, second VR agent 35A' continuously synchronizes flow state information with original VR agent 35A and installs the flow state information in new memory module 306'. After the original VR agent 35A and the second VR agent 35A' are synchronized, ISSU process 312 causes directing component 302 to seamlessly transition individual traffic flows flowing through the original PFC 304, along with its corresponding memory module 306, to the second PFC 304', along with its corresponding memory module 306'. After directing component 302 has migrated the traffic flows, ISSU process 312 deallocates the original PFC 304, memory module 306, and VR agent 35A.

Accordingly, virtual router 30 may continue forwarding individual traffic flows via second PFC 304' and second memory module 304 while retaining flow state information for the various network traffic flows. Thus, it may be seen that, by synchronizing flow state information between old PFC 304 and new PFC 304', new PFC 304' does not need to use slow-path packet processing to rebuild, in new memory module 306', flow state information for active network flows already installed within old memory module 306. Thus, a cloud data center, such as cloud data center 10, that operates according to the techniques of the disclosure may upgrade one or more packet forwarding components of virtual router 30 while ensuring customer traffic flow and customer applications executing within the cloud data center continue without interruption and without rebuilding flow state records for the traffic flows each time an ISSU is performed.

Figure 2A:
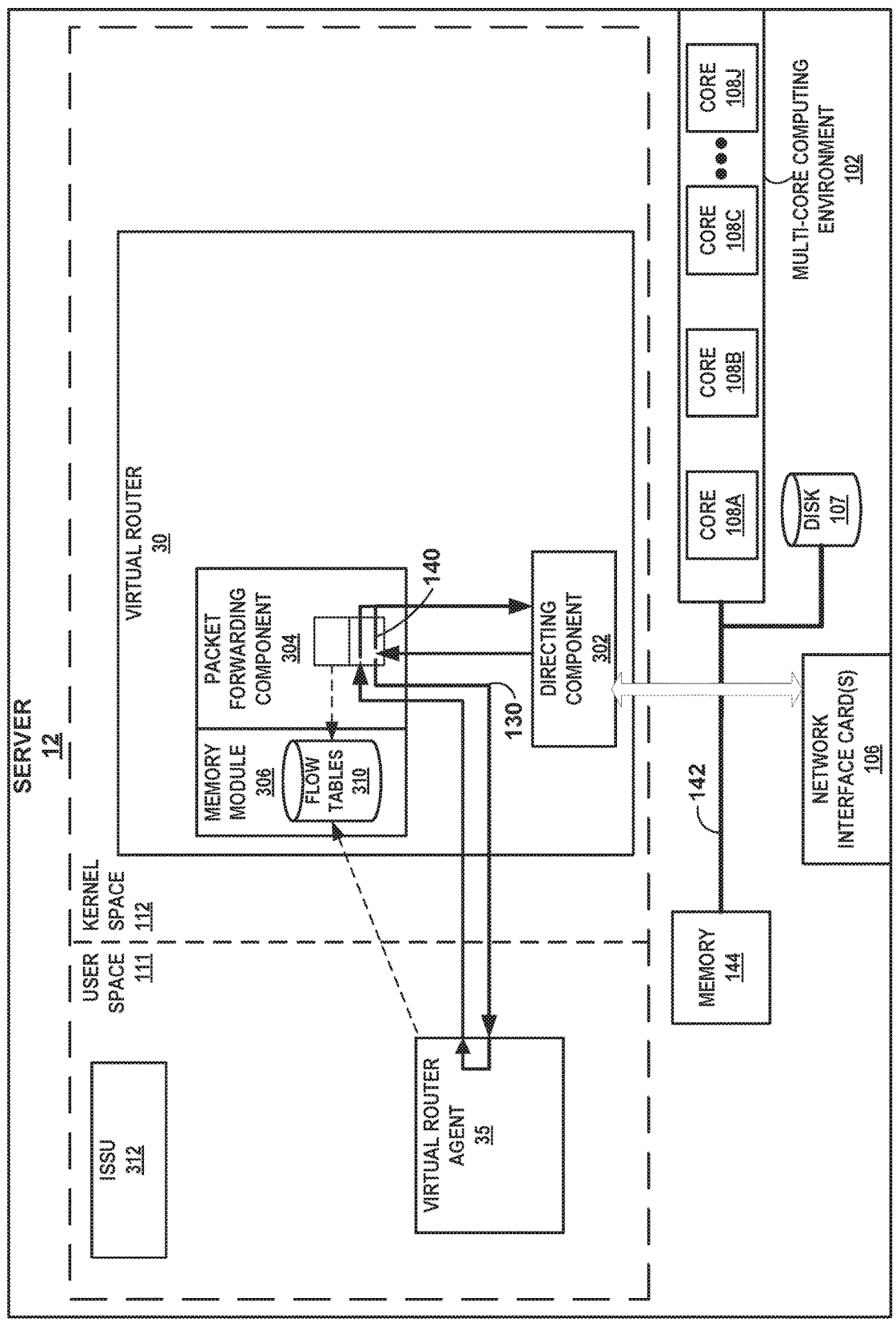
FIGS. 2A-2E are block diagrams illustrating an example ISSU of a packet forwarding component of the virtual router of FIG. 1 in further detail.

FIGS. 2A-2E are block diagrams illustrating an example ISSU of a packet forwarding component of the virtual router of FIG. 1 in further detail. In the example of FIG. 2A, server 12 includes a system bus 142 coupling hardware components of a server 12 hardware environment. System bus 142 couples memory 144, one or more network interface cards (NICs) 106, storage disk 107, and multi-core computing environment 102 having a plurality of processing cores 108A-108J (collectively, "processing cores 108"). Network interface cards 106 include interfaces configured to exchange packets using links of an underlying physical network. Multi-core computing environment 102 may include any number of processors and any number of hardware cores from, for example, four to thousands. Each of processing cores 108 each includes an independent execution unit to perform instructions that conform to an instruction set architecture for the core. Processing cores 108 may each be implemented as separate integrated circuits (ICs) or may be combined within one or more multi-core processors (or "many-core" processors) that are each implemented using a single IC (i.e., a chip multiprocessor).

Disk 107 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by cores 108.

Main memory 144 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 144 provides a physical address space composed of addressable memory locations.

Memory 144 may in some examples present a non-uniform memory access (NUMA) architecture to multi-core computing environment 102. That is, cores 108 may not have equal memory access time to the various storage media that constitute memory 144. Cores 108 may be configured in some instances to use the portions of memory 144 that offer the lowest memory latency for the cores to reduce overall memory latency.

In some instances, a physical address space for a computer-readable storage medium may be shared among one or more cores 108 (i.e., a shared memory). For example, cores 108A, 108B may be connected via a memory bus (not shown) to one or more DRAM packages, modules, and/or chips (also not shown) that present a physical address space accessible by cores 108A, 108B. While this physical address space may offer the lowest memory access time to cores 108A, 108B of any of portions of memory 144, at least some of the remaining portions of memory 144 may be directly accessible to cores 108A, 108B. One or more of cores 108 may also include an L1/L2/L3 cache or a combination thereof. The respective caches for cores 108 offer the lowest-latency memory access of any of storage media for the cores 108.

Memory 144, network interface cards (NICs) 106, storage disk 107, and multi-core computing environment 102 provide an operating environment for a software stack that executes a virtual router 30. The server 12 partitions the virtual and/or physical address space provided by main memory 144 and in the case of virtual memory by disk 107 into user space 111, allocated for running user processes, and kernel space 112, which is protected and generally inaccessible by user processes. An operating system kernel (not shown in FIGS. 2A-2E) may execute in kernel space and may include, for example, a Linux, Berkeley Software Distribution (BSD), another Unix-variant kernel, or a Windows server operating system kernel, available from Microsoft Corp.

Virtual router 30, in this example, operates within kernel space 112, while VR agent 35 operates within user space 111. In some example, Virtual router 30 is a kernel module that terminates overlay connectivity in the SDN environment of FIG. 1. Packet forwarding component 304 executes the "forwarding plane" or packet forwarding functionality of virtual router 30, while VR agent 35 executes the "control plane" functionality of virtual router 30. VR agent 35 may represent an example instance of any of VR agent 35 of FIG. 1.

Virtual router 30 further includes memory module 306. memory module 306 includes flow tables 310. Flow tables 310 may in some instances be logical tables implemented as a single table or other associative data structure in which entries for respective flow tables 310 are identifiable by the virtual network identifier (e.g., a VRF identifier such as VxLAN tag or MPLS label)). Flow tables 310 include flow state information, that is, information sufficient for packet forwarding component 304 to map destination addresses to destination next hops. The destination addresses may include layer 3 network prefixes or layer 2 MAC addresses. Flow tables 310 enable application of forwarding policies to flows. Each of flow tables 310 includes flow table entries that each match one or more flows that may traverse virtual router 30 and include a forwarding policy for application to matching flows.

As an example illustration of the above, upon receiving packets from directing component 302, PFC 304 attempts to match the packets to one of the flow table entries of flow table 310. If a matching flow table entry exists for a given packet, PFC 304 applies the flow actions specified in a policy to the packet and forwards the packet to directing component 302 such that the packet is directed toward its next hop. This may be referred to as "fast-path" packet processing and is represented in FIGS. 2A-2E by fast path 140.

If a matching flow table entry does not exist for the packet, the packet may represent an initial packet for a new packet flow. In this case, PFC 304 forwards the packet to VR agent 35. VR agent 35 inspects the packet and examines routing state information to generate flow state information and forwarding instructions for the new packet flow associated with the packet. VR agent 35 writes a flow table entry in flow table 310 that includes the flow state information and forwarding instructions for the new packet flow. VR agent 35 forwards the packet back to PFC 304. In turn, PFC 304 matches the packet to the new flow table entry installed within flow table 310 and applies the flow actions specified in a policy to the packet. PFC 304 forwards the packet to directing component 302 such that the packet is directed toward its next hop. The above process may be referred to as "slow-path" packet processing for initial packets of packet flows and is represented in FIGS. 2A-2E by slow path 130. Typically, packets may be processed via fast path 140 much more quickly than packets processed via slow path 130 because fast path 140 does not involve invoking tasks in user space 111, examining routing state information associated with the packet, and installing flow state information and forwarding instructions within flow tables 310. Generally, when PFC 304 receives a first packet for a new traffic flow, the first packet is processed via slow path 130 and VR agent 35 installs a flow table entry for the new traffic flow. Subsequently, PFC 304 may use the installed flow table entry for the new traffic flow and thereby make use of fast path 140 for all subsequent packets for the new traffic flow.

The following Tables 1-6 set forth examples of flow state information stored within flow tables 310. In some examples, VR agent 35 generates such flow state information by inspecting packets received by PFC 304 and forwarded to VR agent 35 via slow path 130. In accordance with the techniques of the disclosure, and as described with respect to the examples of FIGS. 2A-2E, VR agents 35 and 35' synchronize such flow state information during an ISSU procedure of PFC 304. In some examples, flow tables 310 store traffic flows, traffic flow records, nexthops (nh), route tables (rt), labels (mpls), and virtual interfaces (vifs). An example of flow tables 310 is described below. In the below example, flow tables 310 have a size of 80609280 and have 629760 entries. Flow tables 310 may maintain metadata describing the flow entries within flow tables 310. Examples of flow entries metadata for flow tables 310 are set forth in Table 1 below:

TABLE 1

Flow entries Metadata:

Created 2605705
Added 2605705
Deleted 4693686
Changed 4955741
Processed 2605705
Used overflow entries 78872
(Created Flows/CPU: 0 0 0 0 0 0 0 0 0 0 52712 521802 519433 469637 522613 519508) (oflows 0)

The following terminology is used to describe flows within flow tables 310:
Action: F=Forward, D=Drop, N=NAT, S=SNAT, D=DNAT, Ps=SPAT, Pd=DPAT,
L=Link Local Port
Other: K(nh)=Key_Nexthop, S(nh)=RPF_Nexthop
Flags: E=Evicted, Ec=Evict Candidate, N=New Flow, M=Modified, Dm=Delete Marked
TCP: r=reverse, S=SYN, F=FIN, R=RST, C=HalfClose, E=Established, D=Dead An example of flow records stored by flow tables 310 is set forth in Table 2 below:

TABLE 2

Example Flow Record

| Index | Source:Port/Destination:Por | Proto(V) |
|---|---|---|
| 0<=>151087 | 42.0.0.1:56288 | 6 (20->21) |
| 41.0.0.1:8080 | | |
| (Gen: 4, K(nh):28, Action:F, Flags:, TCP:S, QOS:-1, S(nh):28, Stats:1124414/220385144, SPort 54104, TTL 0, Sinfo 9.0.0.0) | | |
| 4<=>149250 | 41.0.0.1:22708 | 6 (20->21) |
| 42.0.0.1:8080 | | |
| (Gen: 17, K(nh):28, Action:F, Flags:, TCP:S, QOS:-1, S(nh):39, Stats:1159623/211051386, SPort 56869, TTL 0, Sinfo 13.1.0.254) | | |
| 5<=>250884 | 42.0.0.1:10215 | 6 (20->21) |
| 41.0.0.1:8080 | | |

An example of nexthop information stored by flow tables 310 is set forth in Table 3 below. In some examples, flow tables 310 store, for each nexthop, a type of nexthop, a family (e.g., v4/v6), and refcounts.

TABLE 3

Nexthop Information

Id:0         Type:Drop    Fmly:        Rid:0   Ref_cnt:309403  Vrf:0
Flags: Valid,             AF_INET
Id:1         Type:Drop    Fmly:        Rid:0   Ref_cnt:11905   Vrf:0
Flags: Valid,             AF_INET
Id:3         Type:L2      Fmly:        Rid:0   Ref_cnt:59      Vrf:0
Flags: Valid, Receive     AF_INET
Id:4         Type:Encap   Fmly:        Rid:0   Ref_cnt:1       Vrf:0
Flags: Valid,             AF_INET
EncapFmly:0806 Oif:0 Len:14
Encap Data: 90 e2 ba 5a 8d 4c 90 e2 ba 5a 8d 4c 08 00

An example of routing table information stored by flow tables 310 is set forth in Table 4 below. Further, in some examples, flow tables store, for each route table, an MPLS label to be used and a virtual interface, which is similar to the virtual interface information described below in Table 6.

TABLE 4

Routing Table information
Flags: L = Label Valid, P = Proxy ARP, T = Trap ARP,
F = Flood ARP
vRouter inet4 routing table 0/1/unicast

| Destination | PPL | Flags | Label | Nexthop Stitched MAC(index) |
|---|---|---|---|---|
| 0.0.0.0/8 | 0 | — | 0 | — — |
| 1.0.0.0/8 | 0 | — | 0 | — — |
| 2.0.0.0/8 | 0 | — | 0 | — — |
| 3.0.0.0/8 | 0 | — | 0 | — — |
| 4.0.0.0/8 | 0 | — | 0 | — — |
| 5.0.0.0/8 | 0 | — | 0 | — — |
| 6.0.0.0/8 | 0 | — | 0 | — — |
| 7.0.0.0/8 | 0 | — | 0 | — — |
| 8.0.0.0/8 | 0 | — | 0 | — — |
| 9.0.0.0/8 | 0 | — | 0 | — — |
| 10.0.0.0/8 | 0 | — | 0 | — — |
| 11.0.0.0/8 | 0 | — | 0 | — — |
| 12.0.0.0/8 | 0 | — | 0 | — — |
| 13.0.0.0/8 | 0 | — | 0 | — — |
| 14.0.0.0/8 | 0 | — | 0 | — — |
| 15.0.0.0/8 | 0 | — | 0 | — — |
| 16.0.0.0/8 | 0 | — | 0 | — — |
| 17.0.0.0/8 | 0 | — | 0 | — — |
| 18.0.0.0/8 | 0 | — | 0 | — — |
| 19.0.0.0/8 | 0 | — | 0 | — — |
| 20.0.0.0/24 | 24 | LP | 16 | 22 — |

An example of MPLS input label map information stored by flow tables 310 is set forth in Table 5 below:

TABLE 5

| MPLS Input Label Map | |
|---|---|
| Label | NextHop |
| 16 | 42 |
| 17 | 33 |
| 18 | 192 |
| 19 | 190 |
| 20 | 202 |
| 21 | 201 |
| 22 | 49 |

An example of virtual router interface information stored by flow tables 310 is set forth in Table 6 below. The following terminology is used to describe virtual router interface information within Table 6:

Flags: P=Policy, X=Cross Connect, S=Service Chain, Mr=Receive Mirror, Mt=Transmit Mirror, Tc=Transmit Checksum Offload, L3=Layer 3, L2=Layer 2, D=DHCP, Vp=Vhost Physical, Pr=Promiscuous, Vnt=Native Vlan Tagged, Mnp=No MAC Proxy, Dpdk=DPDK PMD Interface, Rfl=Receive Filtering Offload, Mon=Interface is Monitored, Uuf=Unknown Unicast Flood, Vof=VLAN insert/strip offload, Df=Drop New Flows, Proxy=MAC Requests Proxied Always

TABLE 6

Virtual Router Interface Information

Vrouter Interface Table packets:    557    errors: 2
RX queue errors to lcore:    0 0 0 0 0 0 0 0 0 0 0 1 1 0 0
vif0/0 PCI: 0000:00:00.0 (Speed 10000, Duplex 1)
Type:Physical            HWaddr:90:e2:ba:5a:8d:4c    IPaddr:0
Vrf:0    Flags:TcL3L2Vp    MTU:9018    QOS:-1    Ref 37
RX device packets:339380910382    bytes:78741096013832    errors:824815533
    RX port packets:339380909828    errors:0
RX queue packets:338541864098    errors:832045661
    RX queue errors to lcore: 0 0 0 0 0 0 0 0 0 0 81553232 158092894 383308030 104174242 104917263
RX packets:338548721452    bytes:75839569746386    errors:0
TX packets:316969742450    bytes:71036017054584    errors:0
Drops:871385912
    TX port packets:316969741258    errors:25
TX device packets:316970278943    bytes:73571841685146    errors:0
vif0/1    Virtual: vhost0
Type:Host    HWaddr:90:e2:ba:5a:8d:4c    IPaddr:0
Vrf:0    Flags:L3L2    MTU: 9018    QOS:-1    Ref:12
RX port packets:38731677    errors:0
RX queue packets:38651757    errors:66741
RX queue errors to lcore 0 0 0 0 0 0 0 0 0 0 316 49724 15981 338 382
RX packets:38664936    bytes:52595837619    errors:0
TX packets:17254630    bytes: 1460374880    errors:0
Drops:66744
TX queue packets:15942907    errors:0
TX port packets:17254618    errors:0
vif0/2 Socket: unix
Type:Agent    HWaddr:00:00:5e:00:01:00    IPaddr:0
Vrf:65535    Flags:L3    MTU:1514    QOS:-1    Ref 3
RX port packets:599244    errors:0
RX queue errors to lcore 0 0 0 0 0 0 0 0 0 0 0 0 0 0 0
RX packets:599244    bytes:55861344    errors: 18
TX packets:4322792    bytes:827711789    errors:0
Drops:138
TX queue packets:4322792    errors:0
TX port packets:4322792    errors:0 syscalls:4322812
vif0/3 PMD:tap5f69ea9d-e3
Type: Virtual            HWaddr:00:00:5e:00:01:00    IPaddr:0
Vrf 15    Flags:PL3L2D    MTU:9160    QOS:-1    Ref:19
RX port packets:25900    errors:0 syscalls:1
RX queue packets:557    errors: 2
RX queue errors to lcore 0 0 0 0 0 0 0 0 0 0 0 1 1 0 0
RX packets:25898    bytes:1109394    errors:0
TX packets:51290    bytes:2182534    errors:0
Drops:21464
TX port packets:51187    errors:103    syscalls:51051

Returning to the example of FIGS. 2A-2E, VR agent 35 may be a user space 111 process executed by server 12. VR agent 35 includes configuration data, virtual routing and forwarding instances configurations, and policy data. VR agent 35 exchanges control information with one or more virtual network controllers (e.g., VNC 22 of FIG. 1). Control information may include, virtual network routes, low-level configuration state such as routing instances and forwarding policy for installation to VR agent 35, and policies. VR agent 35 may also report analytics state, install forwarding state to flow tables 310 of memory module 306, etc. As noted above, VR agent 35 further applies slow-path packet processing for the first (initial) packet of each new flow traversing virtual router 30 and installs corresponding flow entries to flow tables 310 for the new flows for fast path processing by directing component 302 of virtual router 30 for subsequent packets of the flows.

Figure 2B:
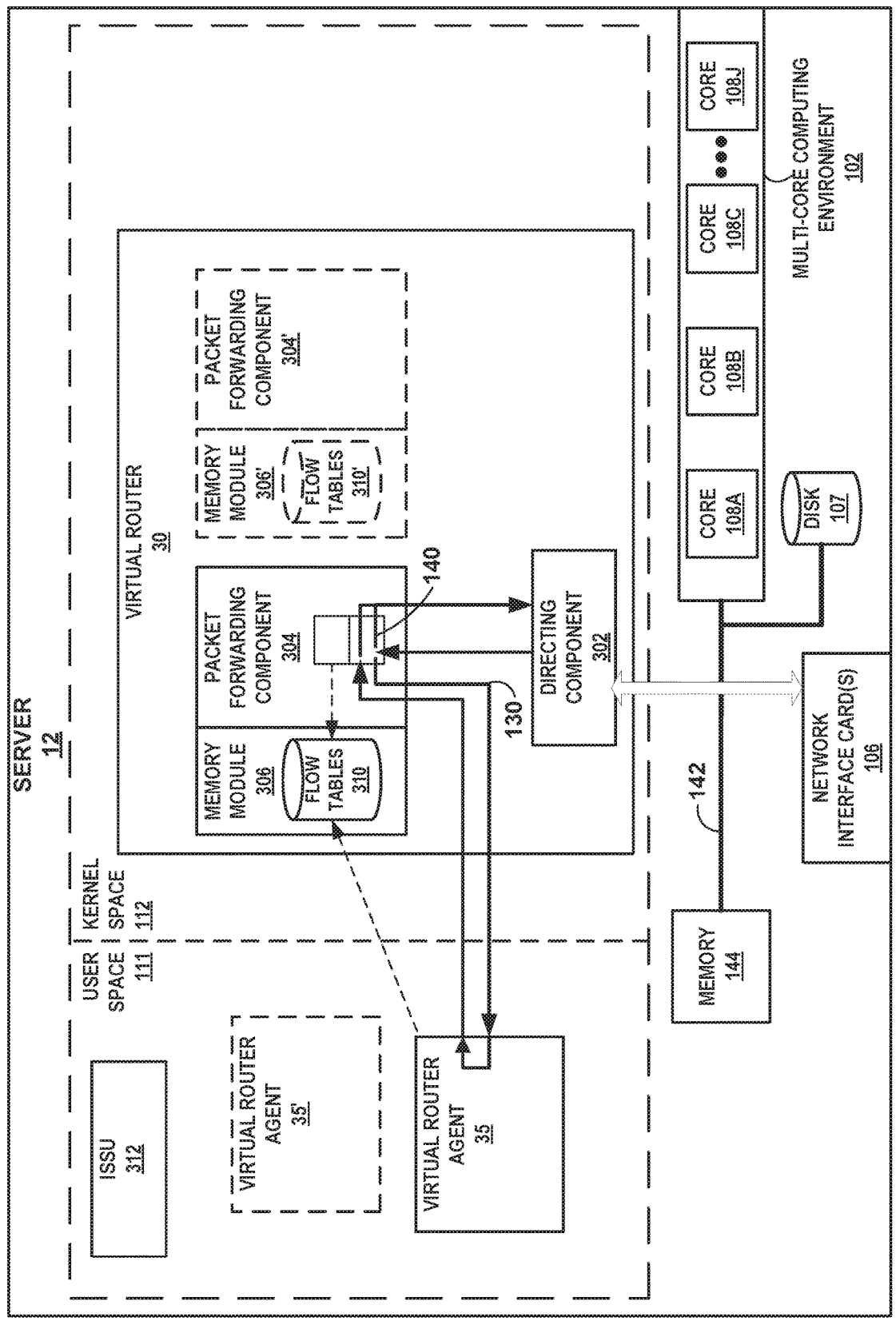

As depicted in FIG. 2B, ISSU process 312 spawns a second VR agent 35' in user space 111. ISSU process 312 further spawns, in kernel space 1122, a second PFC 304' connected to directing component 302 in parallel to PFC 304. ISSU process 312 further spawns a second memory module 306' including second flow tables 310'. Directing component 302 registers PFC 304' as a backup packet forwarding component, while PFC 304 continues to actively process packets for traffic flows.

Figure 2C:
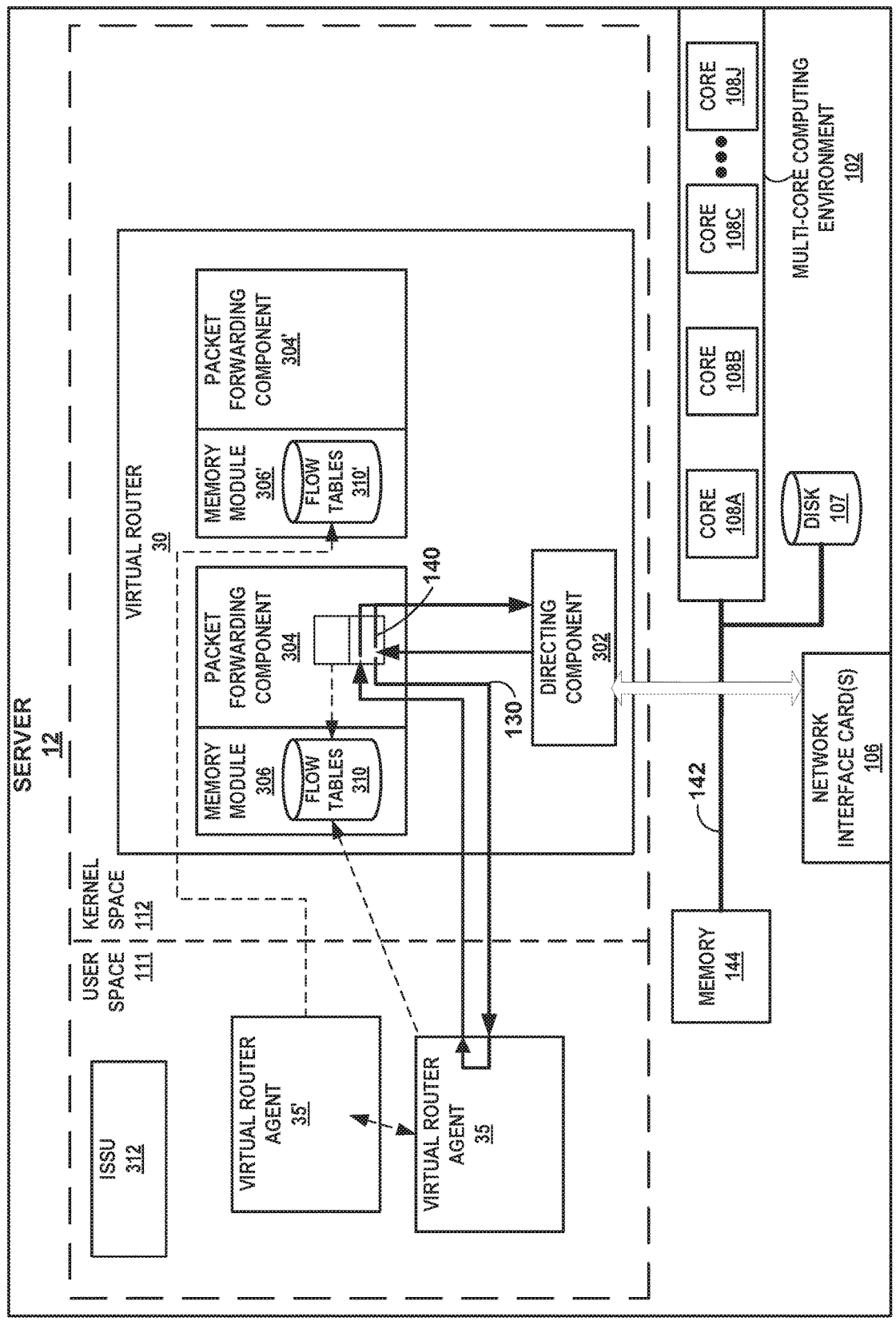

As depicted in FIG. 2C, PFC 304 continues to process packets for virtual router 30. While PFC 304 is in service, VR agent 35 synchronizes flow state information, such as network routing and configuration state data, with VR agent 35'. VR agent 35', in turn, pushes memory module 306' into kernel space 112 and installs the flow state information in new flow tables 310' of new memory module 306'. VR agent 35 further synchronizes flow information and any other existing state information with VR agent 35'. Any new state created in memory module 306 during this operation will be synced to memory module 306' by VR agent 35 and VR agent 35' before VR agent 35 installs the new state in memory module 306. Typically, VR agent 35 and VR agent 35' synchronize existing state between memory module 306 and memory module 306' once. However, VR agent 35 and VR agent 35' continuously synchronize new state between memory module 306 and memory module 306'.

Figure 2D:
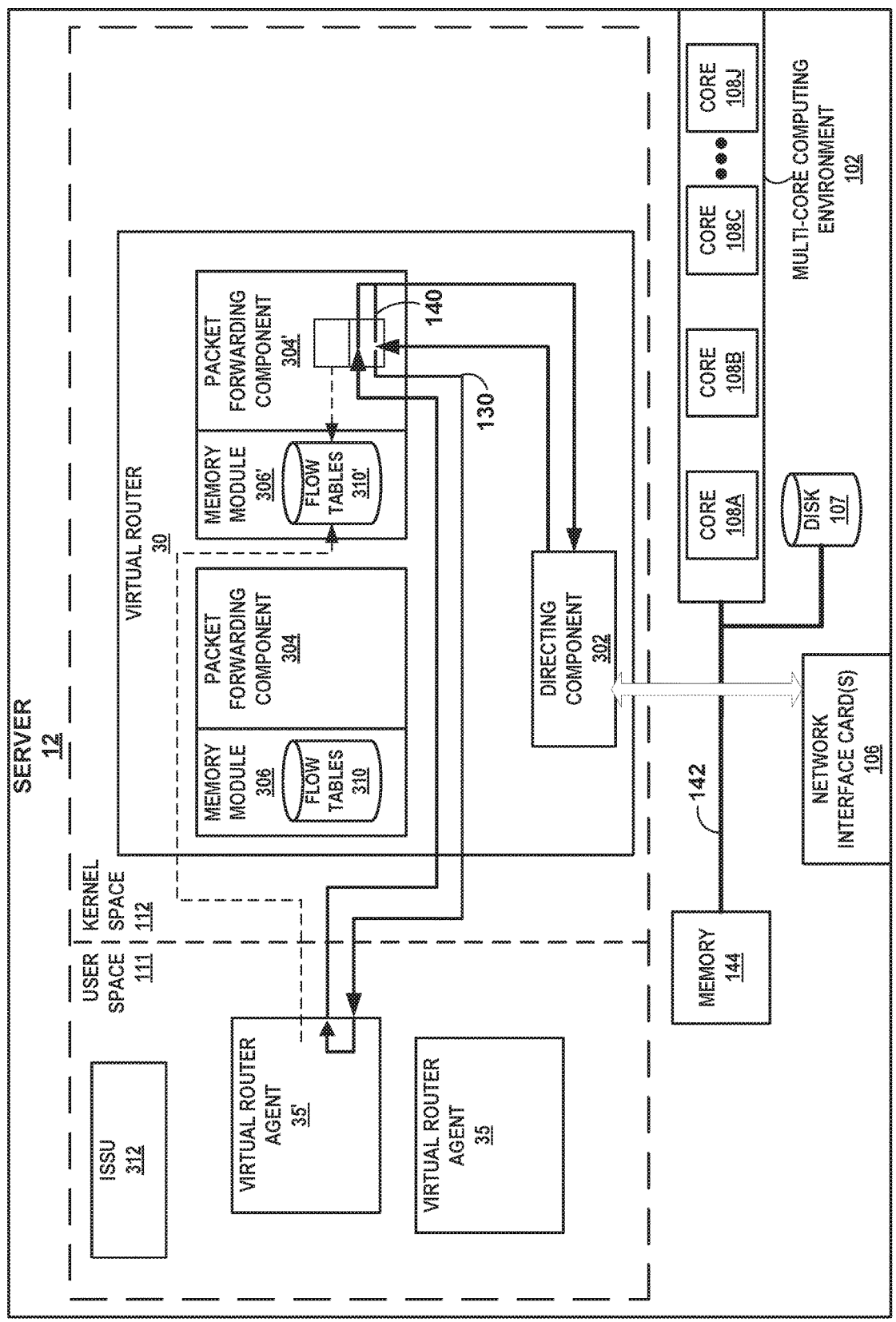

As depicted in FIG. 2D, once VR agent 35 and VR agent 35' synchronize existing flow state and control plane state between memory module 306 and memory module 306', ISSU process 312 causes directing component 302 to swap active packet processing from PFC 304 to PFC 304'. PFC 304' takes over active packet processing for current and new traffic flows directed to virtual router 30. Any flows associated with inflight connection terminations of PFC 304 are permitted to age out.

Figure 2E:
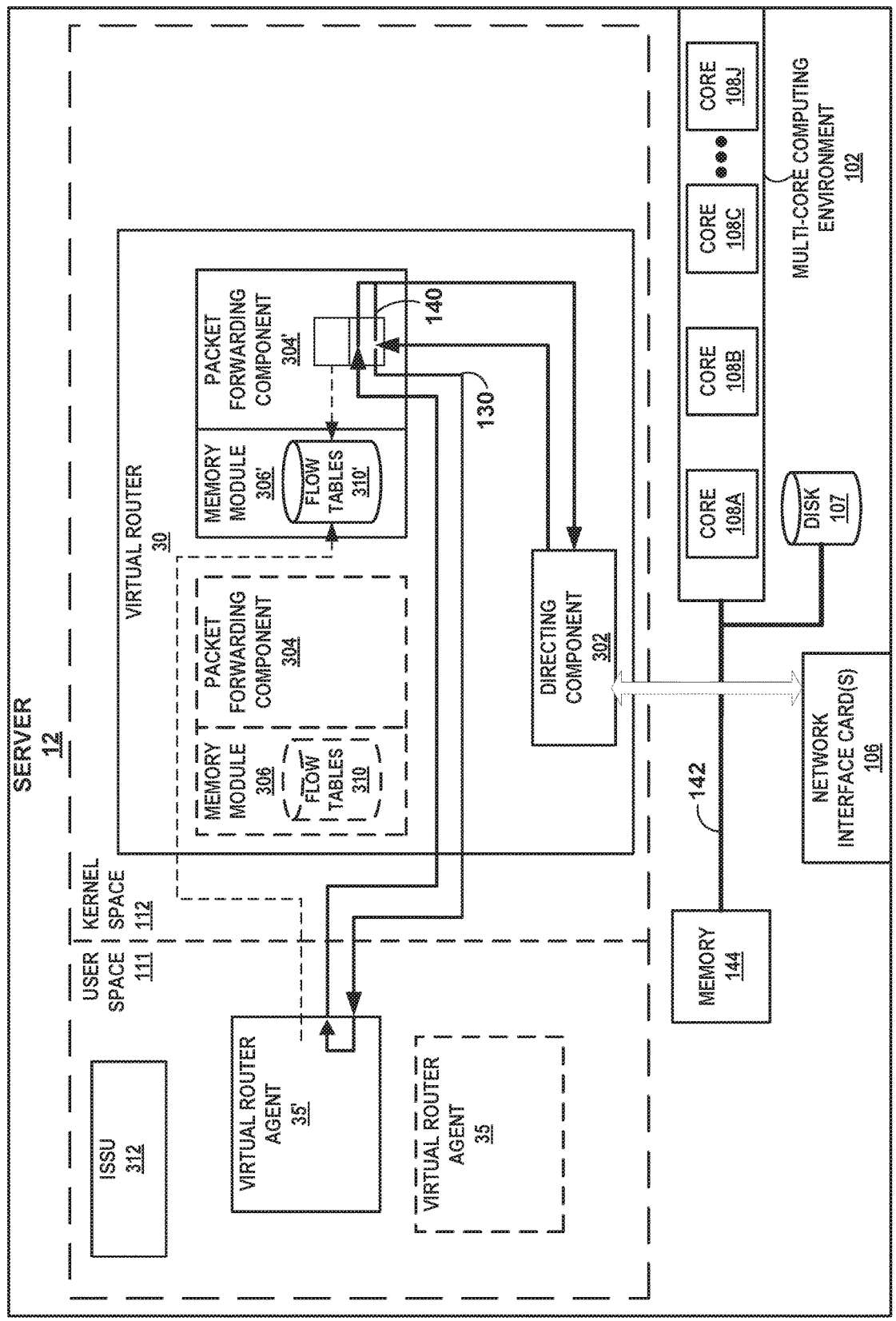

As depicted in FIG. 2E, all traffic analytics counters for PFC 304 are flushed to an analytics database (not depicted). ISSU process 312 deallocates PFC 304, memory module 306, and VR agent 35. Any inflight flow state information that VR agent 35 does not synchronize with VR agent 35' results in associated packets to go through user space processing by VR agent 35' for the corresponding flows to get installed (e.g., slow-path packet processing 130). However, because a large amount of flows are transitioned in kernel space 112 from memory module 306 to memory module 306' during the synchronization process described with respect to FIG. 2C, and because VR agent 35' budgets resources for some new connections, the additional user space processing may be accommodated without disruption to customer traffic. Thus, a cloud data center according to the techniques of the disclosure may upgrade one or more PFCs 304 of virtual router 30 while ensuring customer traffic flow and customer applications executing within the cloud data center continue without interruption and without rebuilding flow state records each time an ISSU is performed.

Furthermore, the techniques of the disclosure allow for in-service software rollback. The operations performed are similar as those described above, except that for an ISSU as described above, PFC 304' is a newer software version of PFC 304, while in an in-service software rollback, PFC 304' is an older software version of PFC 304. Otherwise, to perform an in-service software rollback, the process for substituting PFC 304 with PFC 304' is similar to the ISSU process described above.

Figure 3:
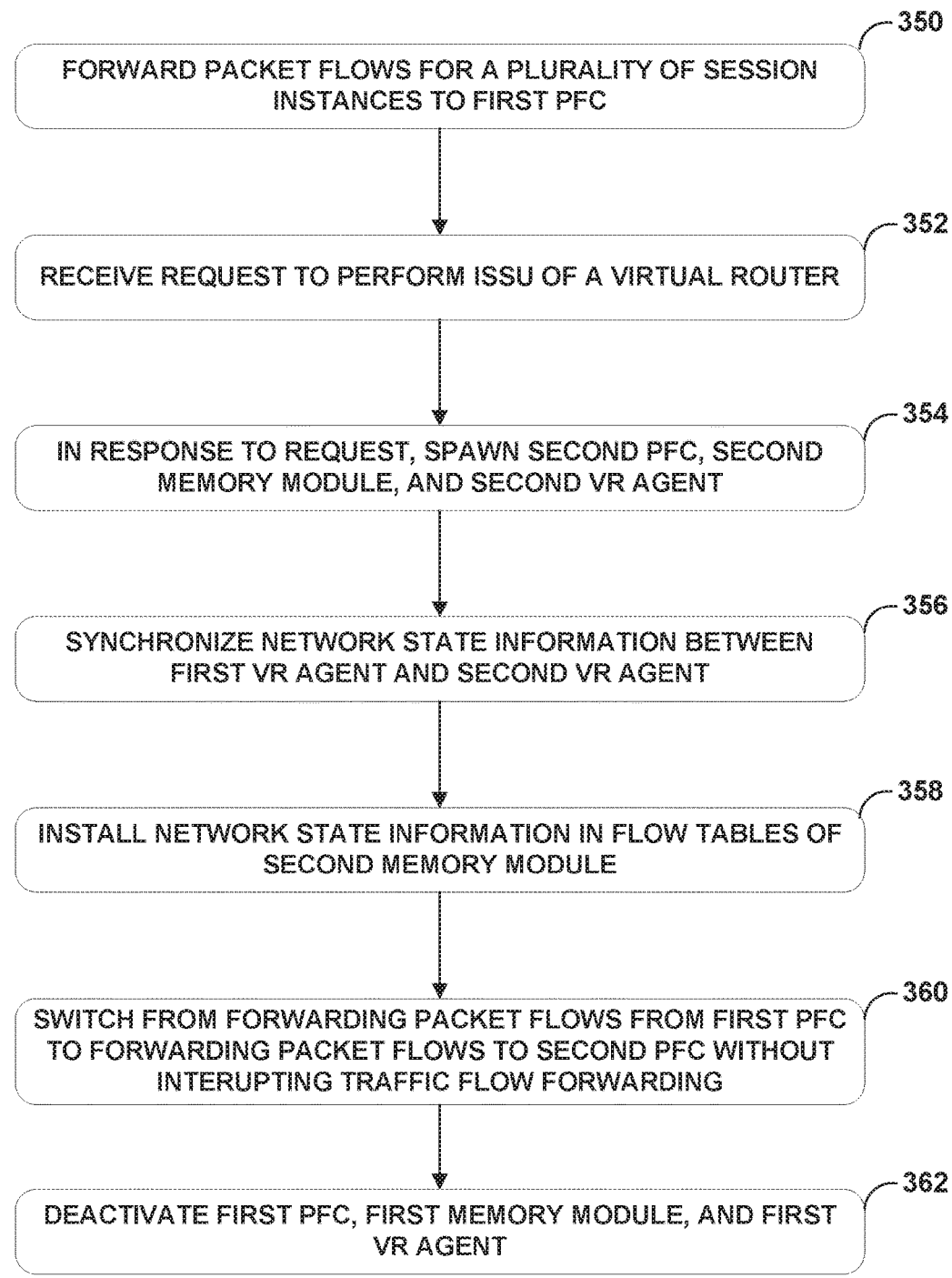
FIG. 3 is a flowchart illustrating an example operation in accordance with the techniques of the disclosure.

FIG. 3 is a flowchart illustrating an example operation in accordance with the techniques of the disclosure. FIG. 3 is described with reference to FIGS. 2A-2E for convenience.

In normal operation, directing component 302 forwards packet flows for a plurality of session instances to PFC 304 for processing (350). ISSU process 312 receives a request to perform an ISSU of virtual router 30 (352). In some examples, ISSU process 312 receives the request from VNC 22, while in other examples, ISSU process 312 receives the request from a network administrator.

In response to the request to perform the ISSU. ISSU process 312 spawns a second PFC 304', second memory module 306', and second VR agent 35' (354). VR agent 35 and VR agent 35' synchronize network sate information (356). After synchronizing the flow state information, VR agent 35' installs the flow state information in flow tables 310' of second memory module 306' (358). ISSU process 312 causes directing component 302 to switch from forwarding the packet flows for the plurality of session instances to the first PFC 304 to forwarding the packet flows for the plurality of session instances to the second PFC 304', without interrupting traffic flow forwarding for the plurality of session instances (360). Further, ISSU process 312 permits any old flows associated with inflight connection terminations of PFC 304 to age out. ISSU process 312 causes VR agent 35 to flush all traffic analytics counters for PFC 304 to an analytics database. After the analytics are sent to the analytics database, ISSU process 312 deactivates first PFC 304, first memory module 306, and first VR agent 35 (362). Thus, a cloud data center according to the techniques of the disclosure may upgrade one or more PFCs 304 of virtual router 30 while ensuring customer traffic flow and customer applications executing within the cloud data center continue without interruption and without rebuilding flow state records each time an ISSU is performed.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
receiving, by at least one processor of a plurality of compute nodes configured to perform compute functions for a plurality of session instances of a cloud data center, a request to perform an in-services software upgrade (ISSU) of a first packet forwarding component for a virtual router, wherein the first packet forwarding component executes within a kernel space of a memory of the plurality of compute nodes and is configured to forward traffic flows for the plurality of session instances, and wherein a first virtual routing agent for the virtual router executes within a user space of the memory and is configured to maintain flow state information for the traffic flows forwarded by the first packet-forwarding component of the virtual router;
spawning, by the at least one processor, a second packet forwarding component for the virtual router within the kernel space of the memory;
spawning, by the at least one processor, a second virtual routing agent for the virtual router within the user space of the memory, wherein the second virtual routing agent is configured to maintain flow state information for the traffic flows forwarded by the second packet-forwarding component of the virtual router;
synchronizing, by the at least one processor, the flow state information of the first virtual routing agent and the flow state information of the second virtual routing agent; and
after synchronizing the flow state information of the first virtual routing agent and the flow state information of the second virtual routing agent, directing, by the at least one processor, the traffic flows for the plurality of session instances from the first packet forwarding component of the virtual router to the second packet forwarding component of the virtual router without interrupting traffic flow forwarding for the plurality of session instances by the virtual router.

2. The method of claim 1,
wherein the flow state information is installed within a first memory module for the virtual router, wherein the first memory module is within the kernel space of the memory,
wherein the method further comprises spawning, by the at least one processor, a second memory module for the virtual router within the kernel space of the memory, and
wherein synchronizing the flow state information of the first virtual routing agent and the flow state information of the second virtual routing agent comprises installing the flow state information installed within the first memory module within the second memory module.

3. The method of claim 2, further comprising:
after directing the traffic flows for the plurality of session instances from the first packet forwarding component to the second packet forwarding component, deactivating the first packet forwarding component, the first memory module, and the first virtual routing agent without interrupting traffic flow forwarding for the plurality of session instances by the virtual router.

4. The method of claim 1, wherein directing the traffic flows for the plurality of session instances from the first packet forwarding component to the second packet forwarding component without interrupting traffic flow forwarding for the plurality of session instances by the virtual router comprises:
forwarding, by the first packet forwarding component, traffic flows for the plurality of session instances, and
switching to forwarding, by the second packet forwarding component, traffic flows for the plurality of session instances, without interrupting traffic flow forwarding for the plurality of session instances by the virtual router.

5. The method of claim 1, further comprising after directing the traffic flows for the plurality of session instances from the first packet forwarding component to the second packet forwarding component without interrupting traffic flow forwarding for the plurality of session instances by the virtual router, permitting at least one traffic flow of the traffic flows for the plurality of session instances to age out, wherein the at least one traffic flow is associated with an in-flight connection termination of the first packet forwarding component.

6. The method of claim 1, further comprising forwarding, by the second packet forwarding component, traffic flows for the plurality of session instances.

7. The method of claim 6, wherein forwarding, by the second packet forwarding component, traffic flows for the plurality of session instances comprises:
receiving, by the second packet forwarding component, a first packet of a traffic flow for the plurality of session instances;
determining, by the second packet forwarding component, that a path for the first traffic flow is not within the second memory module;
directing, by the second packet forwarding component, the first packet to the second virtual routing agent;
installing, by the second virtual routing agent, a path for the traffic flow in the second memory module; and
after installing the path, forwarding, by the second packet forwarding component, subsequent packets for the traffic flow for the plurality of session instances.

8. The method of claim 1, wherein the first packet forwarding component configured to forward traffic flows for the plurality of session instances is configured to:

process the traffic flows to construct aggregate tunnel packets; and forward the aggregate tunnel packets to respective virtual machines of a plurality of virtual machines executed by the plurality of compute nodes.

9. The method of claim 1, wherein the first packet forwarding component configured to forward traffic flows for the plurality of session instances is configured to perform layer-3 forwarding of the traffic flows for the plurality of session instances.

10. At least one processor of a plurality of compute nodes configured to perform compute functions for a plurality of session instances of a cloud data center, the at least one processor configured to:

receive a request to perform an in-services software upgrade (ISSU) of a first packet forwarding component for a virtual router, wherein the first packet forwarding component executes within a kernel space of a memory of the plurality of compute nodes and is configured to forward traffic flows for the plurality of session instances, and wherein a first virtual routing agent for the virtual router executes within a user space of the memory and is configured to maintain flow state information for the traffic flows forwarded by the first packet-forwarding component of the virtual router;

spawn a second packet forwarding component for the virtual router within the kernel space of the memory;

spawn a second virtual routing agent for the virtual router within the user space of the memory, wherein the second virtual routing agent is configured to maintain flow state information for the traffic flows forwarded by the second packet-forwarding component of the virtual router;

synchronize the flow state information of the first virtual routing agent and the flow state information of the second virtual routing agent; and after synchronizing the flow state information of the first virtual routing agent and the flow state information of the second virtual routing agent, direct the traffic flows for the plurality of session instances from the first packet forwarding component of the virtual router to the second packet forwarding component of the virtual router without interrupting traffic flow forwarding for the plurality of session instances by the virtual router.

11. The at least one processor of claim 10, wherein the flow state information is installed within a first memory module for the virtual router, wherein the first memory module is within the kernel space of the memory, wherein the at least one processor is further configured to spawn a second memory module for the virtual router within the kernel space of the memory, and wherein, to synchronize the flow state information of the first virtual routing agent and the flow state information of the second virtual routing agent, the at least one processor is further configured to install the flow state information installed within the first memory module within the second memory module.

12. The at least one processor of claim 11, further configured to:

after directing the traffic flows for the plurality of session instances from the first packet forwarding component to the second packet forwarding component, deactivate the first packet forwarding component, the first memory module, and the first virtual routing agent without interrupting traffic flow forwarding for the plurality of session instances by the virtual router.

13. The at least one processor of claim 10, wherein, to direct the traffic flows for the plurality of session instances from the first packet forwarding component to the second packet forwarding component without interrupting traffic flow forwarding for the plurality of session instances by the virtual router, the at least one processor is further configured to:

forward, via the first packet forwarding component executed by the at least one processor, traffic flows for the plurality of session instances, and switch from forwarding, via the first packet forwarding component, traffic flows for the plurality of session instances to forwarding, by the second packet forwarding component, traffic flows for the plurality of session instances, without interrupting traffic flow forwarding for the plurality of session instances by the virtual router.

14. The at least one processor of claim 10, wherein, after directing the traffic flows for the plurality of session instances from the first packet forwarding component to the second packet forwarding component without interrupting traffic flow forwarding for the plurality of session instances by the virtual router, the at least one processor is further configured to permit at least one traffic flow of the traffic flows for the plurality of session instances to age out, wherein the at least one traffic flow is associated with an in-flight connection termination of the first packet forwarding component.

15. The at least one processor of claim 10, wherein the at least one processor is further configured to forward, via the second packet forwarding component, traffic flows for the plurality of session instances.

16. The at least one processor of claim 15, wherein to forward, via the second packet forwarding component, traffic flows for the plurality of session instances, the at least one processor is further configured to:

receive, via the second packet forwarding component, a first packet of a traffic flow for the plurality of session instances;

determine, via the second packet forwarding component, that a path for the first traffic flow is not within the second memory module;

direct, via the second packet forwarding component, the first packet to the second virtual routing agent;

install, via the second virtual routing agent, a path for the traffic flow in the second memory module; and after installing the path, forward, via the second packet forwarding component, subsequent packets for the traffic flow for the plurality of session instances.

17. A non-transitory computer-readable medium comprising instructions that, when executed, cause at least one processor of a plurality of compute nodes configured to perform compute functions for a plurality of session instances of a cloud data center to:

receive a request to perform an in-services software upgrade (ISSU) of a first packet forwarding component for a virtual router, wherein the first packet forwarding component executes within a kernel space of a memory of the plurality of compute nodes and is configured to forward traffic flows for the plurality of session instances, and wherein a first virtual routing agent for the virtual router executes within a user space of the memory and is configured to maintain flow state information for the traffic flows forwarded by the first packet-forwarding component of the virtual router;

spawn a second packet forwarding component for the virtual router within the kernel space of the memory;

spawn a second virtual routing agent for the virtual router within the user space of the memory, wherein the second virtual routing agent is configured to maintain flow state information for the traffic flows forwarded by the second packet-forwarding component of the virtual router;

synchronize the flow state information of the first virtual routing agent and the flow state information of the second virtual routing agent; and after synchronizing the flow state information of the first virtual routing agent and the flow state information of the second virtual routing agent, direct the traffic flows for the plurality of session instances from the first packet forwarding component of the virtual router to the second packet forwarding component of the virtual router without interrupting traffic flow forwarding for the plurality of session instances by the virtual router.

18. The computer-readable medium of claim 17, wherein the flow state information is installed within a first memory module for the virtual router, wherein the first memory module is within the kernel space of the memory, wherein the at least one processor is further configured cause the at least one processor to spawn a second memory module for the virtual router within the kernel space of the memory; and wherein, to synchronize the flow state information of the first virtual routing agent with the second virtual routing agent, the at least one processor is further configured to install the flow state information installed within the first memory module within the second memory module.

19. The at least one processor of claim 18, further configured cause the at least one processor to:

after directing the traffic flows for the plurality of session instances from the first packet forwarding component to the second packet forwarding component, deactivate the first packet forwarding component, the first memory module, and the first virtual routing agent without interrupting traffic flow forwarding for the plurality of session instances by the virtual router.

* * * * *